US012729447B2

(12) United States Patent
Xie et al.

(10) Patent No.: US 12,729,447 B2
(45) Date of Patent: Sep. 8, 2026

(54) METHOD FOR ELECTROCHEMICAL SYNCHRONOUS SYNTHESIS OF UREA AND STRUVITE USING NITROGEN AND PHOSPHORUS POLLUTANTS AND WASTE GAS FIELD

(71) Applicant: NANCHANG UNIVERSITY, Nanchang (CN)

(72) Inventors: Xianchuan Xie, Nanchang (CN); Ruimin Zhao, Nanchang (CN); Yalan Zhang, Nanchang (CN); Yixuan Huang, Nanchang (CN)

(73) Assignee: NANCHANG UNIVERSITY, Nanchang (CN)

( * ) Notice: Subject to any disclaimer, the term of this patent is extended or adjusted under 35 U.S.C. 154(b) by 0 days.

(21) Appl. No.: 19/444,216

(22) Filed: Jan. 9, 2026

(65) Prior Publication Data

US 2026/0201575 A1 Jul. 16, 2026

(30) Foreign Application Priority Data

Jan. 10, 2025 (CN) ........................ 202510041247.6

(51) Int. Cl.
*C25B 3/09* (2021.01)
*C01B 25/45* (2006.01)
(Continued)

(52) U.S. Cl.
CPC .............. *C25B 3/09* (2021.01); *C01B 25/451* (2013.01); *C02F 1/461* (2013.01); *C05B 7/00* (2013.01);
(Continued)

(58) Field of Classification Search
None
See application file for complete search history.

(56) References Cited

U.S. PATENT DOCUMENTS

2017/0260066 A1 9/2017 Powell

FOREIGN PATENT DOCUMENTS

CN 107235537 A 10/2017
CN 109264834 A * 1/2019 ............. C02F 1/463
CN 114807977 A 7/2022

OTHER PUBLICATIONS

Machine translation of Zeng et al. CN 107235537 A (Year: 2017).*
(Continued)

*Primary Examiner* — Wojciech Haske
(74) *Attorney, Agent, or Firm* — JEEN IP LAW, LLC

(57) ABSTRACT

Disclosed is a method for electrochemical synchronous synthesis of urea and struvite using nitrogen and phosphorus pollutants and waste gas, in the field of sewage and waste gas treatment. The electrocatalytic process comprises: an electrocatalytic oxidation stage utilizing a strong oxidizing anode to oxidize nitrogen and phosphorus in sewage into an inorganic state, simultaneously promoting magnesium ion release, including steps of anode preparation, cell construction, and oxidation; and an electrocatalytic reduction stage utilizing a strong reducing cathode to couple oxidized nitrate and nitrite nitrogen and industrial waste gas (mainly CO2) into urea, generating struvite precipitation, including steps of cathode preparation and reduction. This system achieves resourcization of nitrogen, phosphorus, and carbon dioxide alongside water purification.

4 Claims, 7 Drawing Sheets

(1-electrochemical workstation; 2-high-concentration nitrogen and phosphorus sewage; 3-anode cell; 4-cathode cell; 5-anode; 6-cathode; 7-0.1 M $Na_2SO_4$ electrolyte; 8-magnesite; 9-proton exchange membrane)

(51) Int. Cl.
*C02F 1/461* (2023.01)
*C05B 7/00* (2006.01)
*C25B 1/18* (2006.01)
*C25B 9/19* (2021.01)
*C25B 11/043* (2021.01)
*C25B 11/052* (2021.01)
*C25B 11/061* (2021.01)
*C25B 11/097* (2021.01)

(52) U.S. Cl.
CPC .................. *C25B 1/18* (2013.01); *C25B 9/19* (2021.01); *C25B 11/043* (2021.01); *C25B 11/052* (2021.01); *C25B 11/061* (2021.01); *C25B 11/097* (2021.01)

(56) References Cited

OTHER PUBLICATIONS

Machine translation of Liu et al. CN 114807977 A (Year: 2022).*
Machine translation of Feng et al. CN 109264834 A (Year: 2019).*
Liao et al. "Efficient degradation of inorganic " Journal of Hazardous Materials Advances 6 '2022' 100093 (Year: 2022).*

* cited by examiner (1-electrochemical workstation; 2-high-concentration nitrogen and phosphorus sewage; 3-anode cell; 4-cathode cell; 5-anode; 6-cathode; 7-0.1 M $Na_2SO_4$ electrolyte; 8-magnesite; 9-proton exchange membrane)

1-electrochemical workstation; 2-industrial waste gas mainly containing $CO_2$; 3-cathode cell; 4-anode cell; 5-cathode; 6-anode; 7-0.1 M $Na_2SO_4$ electrolyte; 8-struvite precipitation; 9-proton exchange membrane

METHOD FOR ELECTROCHEMICAL SYNCHRONOUS SYNTHESIS OF UREA AND STRUVITE USING NITROGEN AND PHOSPHORUS POLLUTANTS AND WASTE GAS FIELD

CROSS-REFERENCE TO RELATED APPLICATIONS

The application claims priority to Chinese patent application No. 2025100412476, filed on Jan. 10, 2025, the entire contents of which are incorporated herein by reference.

TECHNICAL FIELD

The present disclosure belongs to the technical field of sewage and waste gas treatment, and specifically relates to a method for electrochemical synchronous synthesis of urea and struvite using nitrogen and phosphorus pollutants and waste gas.

BACKGROUND

Nitrogen and phosphorus pollution can cause water body eutrophication, deteriorate water quality, and destroy aquatic ecosystems. Nitrogen in a human body can be converted into a toxic substance nitrite, not only leading to hypoxia and asphyxiation, but even potentially inducing a cancerous change in parts such as nerve, skeleton, brain, skin, and intestine. Phosphorus may induce a health problem such as a liver injury and a respiratory system disease. At the same time, although renewable energy such as wind energy and solar energy develops rapidly, nearly 80% of energy still needs to rely on burning fossil fuel to be provided, causing carbon dioxide emissions to far exceed a safety CO2 concentration upper limit of 350 ppm, causing a huge threat such as global climate warming leading to melting of a bipolar glacier submerging a city, and increased seawater acidity affecting growth and reproduction of a marine organism.

Aiming at three kinds of pollutants of nitrogen, phosphorus, and carbon dioxide, current nitrogen and phosphorus treatment technologies mainly include: a biological method, an ion exchange method, a dialysis method, a chemical precipitation method, and the like. The biological method has high treatment efficiency and is environment-friendly, but a reaction condition needs to be strictly controlled, and a reaction cycle is relatively long; the ion exchange method and the dialysis method are highly efficient, but only separation and concentration are performed on the pollutants, and a subsequent treatment cost is high; while the chemical precipitation method needs adding a large amount of chemical reagent, easily causing secondary pollution. Carbon dioxide treatment technologies are mainly divided into two major categories: capture and storage, and conversion. Capture and storage face a huge threat of leakage, and a treatment cost is high; in conversion technology, a microbial method has a long treatment cycle and is only suitable for small-scale treatment, and thermal catalysis treatment has large energy consumption, increasing an environmental burden. If carbon dioxide in waste gas and nitrogen and phosphorus in sewage can be converted together into high-quality fertilizer-urea and struvite-through electrocatalysis, these problems will be effectively solved. Traditional industrial synthesis of urea usually utilizes carbon dioxide and ammonia gas to react under high temperature and high pressure, and defects such as low production efficiency, high energy consumption, and aggravating greenhouse effect exist. Existing struvite recovering technology also faces problems such as high operation cost and large energy consumption. Electrocatalysis technology can fill a deficiency of existing nitrogen, phosphorus, and carbon dioxide recovering, not only removing the pollutants, but also providing a green and high-efficiency new pathway for synthesizing the high-quality fertilizer, achieving a goal of turning waste into treasure.

SUMMARY

Aiming at content mentioned in the background, provided in the present disclosure is a method for electrochemical synchronous synthesis of urea and struvite using nitrogen and phosphorus pollutants and waste gas, aiming at synthesizing high-quality fertilizer-urea and struvite-using pollutants such as nitrogen and phosphorus in sewage and carbon dioxide in waste gas with high-efficiency and green electrochemical technology, achieving "turning waste into treasure" in a true sense, and providing a green and high-efficiency new pathway for synthesizing urea and struvite, which is a treatment technology with multiple gains with one move.

Provided in the present disclosure is a method for electrochemical synchronous synthesis of urea and struvite using nitrogen and phosphorus pollutants and waste gas, including the following steps:

Step 1: preparing an anode material using $RuO_2$, $IrO_2$, and $Ti_4O_7$, and using graphite as a cathode to construct a dual-chamber type H-type electrolytic cell; introducing sewage containing nitrogen and phosphorus and magnesite into an anode region, and connecting a power source to perform an electrocatalytic oxidation reaction;

a main reaction formula in Step 1 is:

$$\text{organic nitrogen} \rightarrow NO_3^- + NO_2^-$$

$$\text{organic phosphorus} \rightarrow PO_4^{3-}$$

$$\text{magnesite} \rightarrow Mg^{2+};$$

Step 2: preparing a metal-loaded $In(OH)_3$ nanomaterial; on a basis of the electrolytic cell in Step 1, using the $In(OH)_3$ nanomaterial to replace the anode prepared by $RuO_2$, $IrO_2$, and $Ti_4O_7$ to become a new cathode, and using graphite as a new anode; introducing waste gas containing carbon dioxide into a cathode region; and exchanging positive and negative electrodes and connecting a power source to perform an electrocatalytic reduction reaction to obtain urea and struvite;

a main reaction formula in Step 2 is:

$$2NO_3^- + CO_2 + 18H^+ + 16e^- \rightarrow NH_2CONH_2\text{(urea)} + 7H_2O$$

$$CO_2 + 2NO_2^- + 14H^+ + 12e^- \rightarrow NH_2CONH_2\text{(urea)} + 5H_2O$$

$$NH_4^+ + Mg^{2+} + PO_4^{3-} + 6H_2O \rightarrow Mg(NH_4)PO_4 \cdot 6H_2O \text{ (struvite)}.$$

Further, a specific method for preparing the anode material using $RuO_2$, $IrO_2$, and $Ti_4O_7$ in Step 1 is: using nickel foam as a substrate material of an electrode; taking equal mass of $RuO_2$, $IrO_2$, and $Ti_4O_7$ to be added into a distilled water/ethanol dispersant; performing ultrasonic dispersion to a uniform ink-like state; and adding conductive adhesive for coating onto a treated titanium plate to obtain a $RuO_2$, $IrO_2$, and $Ti_4O_7$ nickel foam anode material.

Further, the dual-chamber type H-type electrolytic cell in Step 1 uses 0.1 mmol/L $Na_2SO_4$ as an electrolyte, and the cathode region and the anode region are separated by a proton exchange membrane; and a proportion of organic nitrogen and phosphorus in the sewage containing nitrogen and phosphorus is 5:1.

The present disclosure adopts a traditional H-type electrolytic cell, a purpose is to concentrate the sewage in the anode region for processing to improve treatment efficiency, and the anode adopts three kinds of strong oxidizing property materials of $RuO_2$, $IrO_2$, and $Ti_4O_7$ with strong corrosion resistance, good electrical conductivity property, and high electrocatalytic activity, specifically, a $RuO_2$ electrode has an advantage of low internal resistance, an $IrO_2$ electrode has strong stability, high reversibility, and strong wear resistance, and a $Ti_4O_7$ electrode has acid and alkali resistance and possesses a widest electrochemical window; after connecting a direct current power source, nitrogen and phosphorus in the sewage are oxidized as much as possible into an inorganic state such as $NO_3^-$, $NO_2^-$, $NH_4^+$, and $PO_4^{3-}$ by using a strong oxidizing property anode through a pathway of electron transfer, providing a raw material for subsequent electrocatalytic reduction process coupling high-quality fertilizer, and at the same time, the anode region continuously produces H+ to create an acidic environment, promoting the magnesite to continuously precipitate out Mg2+ into a solution, creating a microenvironment for generation of struvite.

Further, a preparation method of the metal-loaded $In(OH)_3$ nanomaterial in Step 2 is: ultrasonically dispersing $In(OH)_3$ powder in deionized water; adding a compound of metal M for stirring; adding a sodium carbonate solution to obtain a suspension; and after filtering, washing, and drying, calcining to obtain a metal M-loaded $In(OH)_3$ nanomaterial.

Further, the calcining is performed in an $H_2$/Ar mixture, and a calcining temperature is 250° C.; and the metal Mis Fe, Mn, or Co.

Further, the electrocatalytic reduction reaction in Step 2 uses a pulse potential and a constant potential to inhibit a side reaction to increase a yield of urea, a multi-stage potential is −0.3 to −0.9 V vs. RHE, and a pH of a solution in the anode region is adjusted to 9 through the pulse potential.

The electrocatalytic reduction device of the present disclosure is obtained only by performing simple retrofitting on a basis of an original electrocatalytic oxidation device: using the metal M-loaded $In(OH)_3$ nanomaterial to replace the $RuO_2$, $IrO_2$, and $Ti_4O_7$ electrode to become a new cathode, specifically, the chamber is transformed from the original anode region into a cathode region, using a graphite plate as a new anode, specifically, the chamber is transformed from the original cathode region into an anode region, and exchanging positions of positive and negative voltages, the retrofitting of the device can be completed, effectively saving equipment cost. Waste gas containing carbon dioxide is introduced into the cathode region, and after connecting the direct current power source, nitrate and nitrite in the sewage after electrocatalytic oxidation and carbon dioxide gas are coupled as raw materials into urea under an action of current; and the pH of the solution in the anode region is adjusted to 8-10 through the pulse potential, promoting magnesium ion precipitated out from the magnesite to generate struvite precipitation with ammonia nitrogen and phosphate radical.

A nitrogen source utilized for electrocatalytic synthesis of urea in the process of the present disclosure is nitrate nitrogen after electrocatalytic oxidation of organic nitrogen sewage, a raw material for industrial synthesis of urea is $N_2$, while bond energy of N≡N is nearly five times that of N═O, and a reaction process of the present disclosure can be performed under normal temperature and normal pressure, solving a key problem of high energy consumption in the prior art. In a process of electrocatalytic reaction, chemical reaction mainly relies on electron transfer, and no additional chemical agent needs to be added, thereby avoiding secondary pollution, and negative influence on environment is small. In addition, nitrogen and phosphorus sewage is mostly in an organic state, the present disclosure removes organic matter by preparing a strong oxidizing property anode material, rapidly degrading organic pollutant into an inorganic state, and then achieves a purpose of purifying water body by preparing a high selectivity cathode material to reduce $CO_2$ and the like; different from a traditional treatment process, the method not only removes a toxic and harmful substance, but also can convert the toxic and harmful substance into a recycling resource, effectively reducing environmental pollution and at the same time achieving waste resourcization, promoting sustainable development.

Aiming at two major problems of water body nitrogen and phosphorus pollution and greenhouse effect, an electrocatalytic process designed in the present disclosure is as follows: a first part is an electrocatalytic oxidation stage: utilizing the strong oxidizing property anode to oxidize nitrogen and phosphorus in the sewage into an inorganic state as much as possible, and at the same time promoting release of magnesium ion, and specific steps include: preparing the strong oxidizing property anode, building an electrolytic cell device, and performing an electrocatalytic oxidation process.

A second part is an electrocatalytic reduction stage: utilizing a strong reducing property cathode to couple nitrate nitrogen and nitrite nitrogen in the sewage after oxidation and industrial waste gas (mainly containing $CO_2$ gas) into urea, and generation of struvite precipitation, and specific steps include: preparing the strong reducing property cathode, and performing an electrocatalytic reduction process. Through such an electrochemical system design, purposes of resourcization conversion of nitrogen and phosphorus in sewage and carbon dioxide in waste gas and water quality purification are well achieved.

The present technology has the following advantages:

(1) Strong environment-friendly type. Using renewable energy (such as solar energy, wind energy, and tidal energy) to provide electric energy for electrochemical technology, no additional chemical agent is needed, significantly reducing a risk of secondary pollution, and reducing negative influence on environment.

(2) Strong controllability. Selective control of reaction product can be achieved by selecting different electrode materials, which makes generation of product more flexible, helping to meet different needs.

(3) Simple operation. Equipment design is simple, operation and maintenance are not complex, reducing production and maintenance cost, and improving convenience of use.

(4) Efficient resource utilization. Not only can pollutants in sewage and waste gas be effectively removed, but these pollutants can also be converted into valuable chemical products urea and struvite. This is an effective pathway of "turning waste into treasure", promoting efficient utilization of resources.

The present disclosure combines characteristics of high efficiency, green environmental protection, and simple operation, conforming to an environmental protection concept, and especially has a good development prospect in a field of sewage and waste gas treatment. By converting the pollutants into valuable products, environmental protection ideas of resourcization, harmlessness, and reduction are further deepened, making a contribution to achieving a sustainable development goal.

DETAILED DESCRIPTION OF THE EMBODIMENTS

To make an objective, a technical solution, and advantages of the present disclosure clearer, the technical solution of the present disclosure will be clearly and completely described below in combination with examples. For those not indicating specific conditions in the examples, the examples are performed according to conventional conditions or conditions suggested by a manufacturer. For reagents or instruments used where a manufacturer is not indicated, the reagents or instruments are all conventional products that can be obtained through commercial purchase.

Unless defined otherwise, all technical and scientific terms used herein have the same meaning as commonly understood by those skilled in the technical field of the present disclosure. Terms used in the specification of the present disclosure are only for the purpose of describing specific examples, and are not intended to limit the present disclosure. The term "and/or" used herein includes any and all combinations of one or more related listed items.

EXAMPLE

A method for electrochemical synchronous synthesis of urea and struvite using nitrogen and phosphorus pollutants and waste gas includes:

1. Preparation of Three Kinds of $RuO_2$, $IrO_2$, and $Ti_4O_7$ Nickel Foam Anode Materials by a Coating Method Porous nickel foam is cut into a required shape (a size is about 5 cm×5 cm), serving as a substrate material of an electrode. 10 mg of each of $RuO_2$, $IrO_2$, and $Ti_4O_7$ powders is taken respectively, added into a dispersant containing 20 μL of distilled water and 900 μL of ethanol, and dispersed to a uniform ink-like state using ultrasonic dispersion; and 80 μL of conductive adhesive Nafion is added for coating onto a treated titanium plate. After coating each layer, baking needs to be performed for 4 h under a condition of 200° C. in vacuum, and brushing is repeated three times to obtain three kinds of $RuO_2$, $IrO_2$, and $Ti_4O_7$ nickel foam anode materials.

2. Electrocatalytic Oxidation

Figure 1:
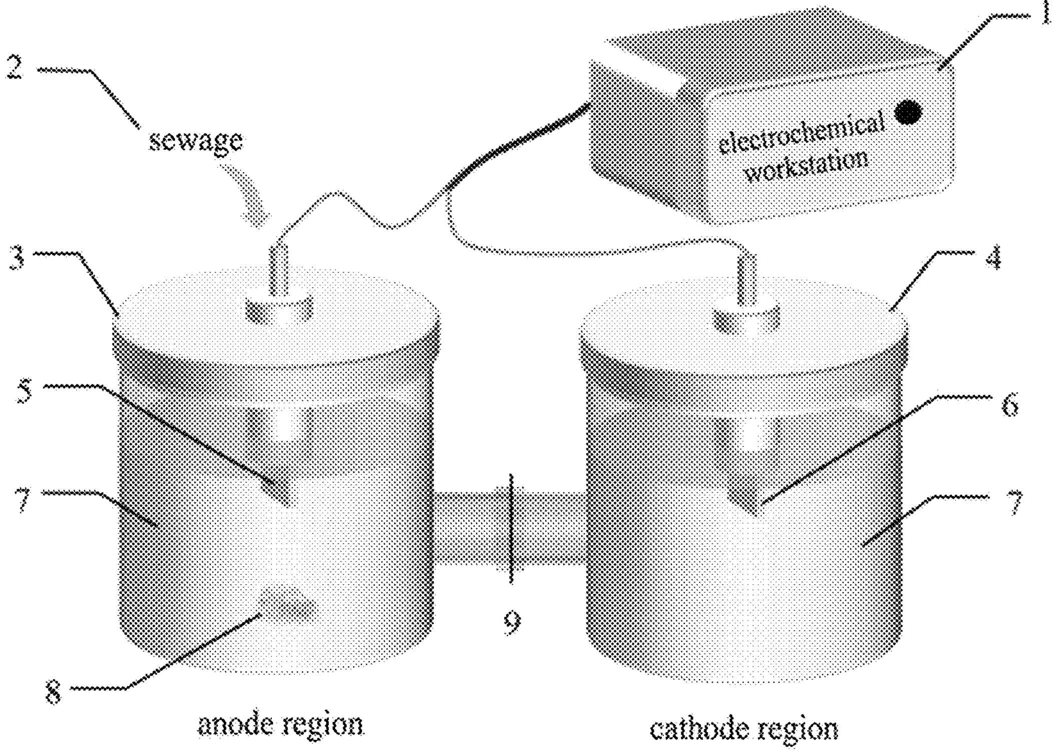
FIG. 1 is a diagram of an electrocatalytic oxidation device.

Using the $RuO_2$, $IrO_2$, and $Ti_4O_7$ nickel foam anode materials as an anode, and a graphite plate (5 cm×5 cm) as a cathode, an anode region and a cathode region are separated by a proton exchange membrane, and an electrolyte is 0.1 mmol/L $Na_2SO_4$. Groundwater of Zhanggong District, Ganzhou (organic nitrogen and phosphorus contents are respectively about 80 mg/L and 17 mg/L, accounting for about 75% and 60% of total nitrogen and total phosphorus) to be treated and magnesite are introduced into the anode region to construct an H-type electrocatalytic oxidation electrolytic cell device (FIG. 1); and a direct current is connected to provide an ultra-low voltage (−0.6 V vs. RHE). Under an action of current, organic nitrogen and phosphorus in the anode region are oxidized into an inorganic state, providing a raw material for subsequent coupling of high-quality fertilizer. During a process of electrolysis, $H^+$ precipitates out in the anode region to produce an acidic environment, promoting the magnesite to continuously precipitate out magnesium ion.

3. Preparation of Cathode 3 g of $In(OH)_3$ powder is dispersed in 10 mL of deionized water for ultrasonic treatment for 20 min, 0.2 mol of iron chloride hexahydrate is added for stirring, and 0.5 mol/L $Na_2CO_3$ aqueous solution (2 mL) is further added to obtain a suspension. After stirring for a long time, filtering is performed, and surface impurities are washed with deionized water. Drying is performed in an oven, and finally, calcining is performed for 1 h at 250° C. in an $H_2$/Ar mixture to obtain an Fe-loaded $In(OH)_3$ nanomaterial.

4. Electrocatalytic Reduction

Figure 2:
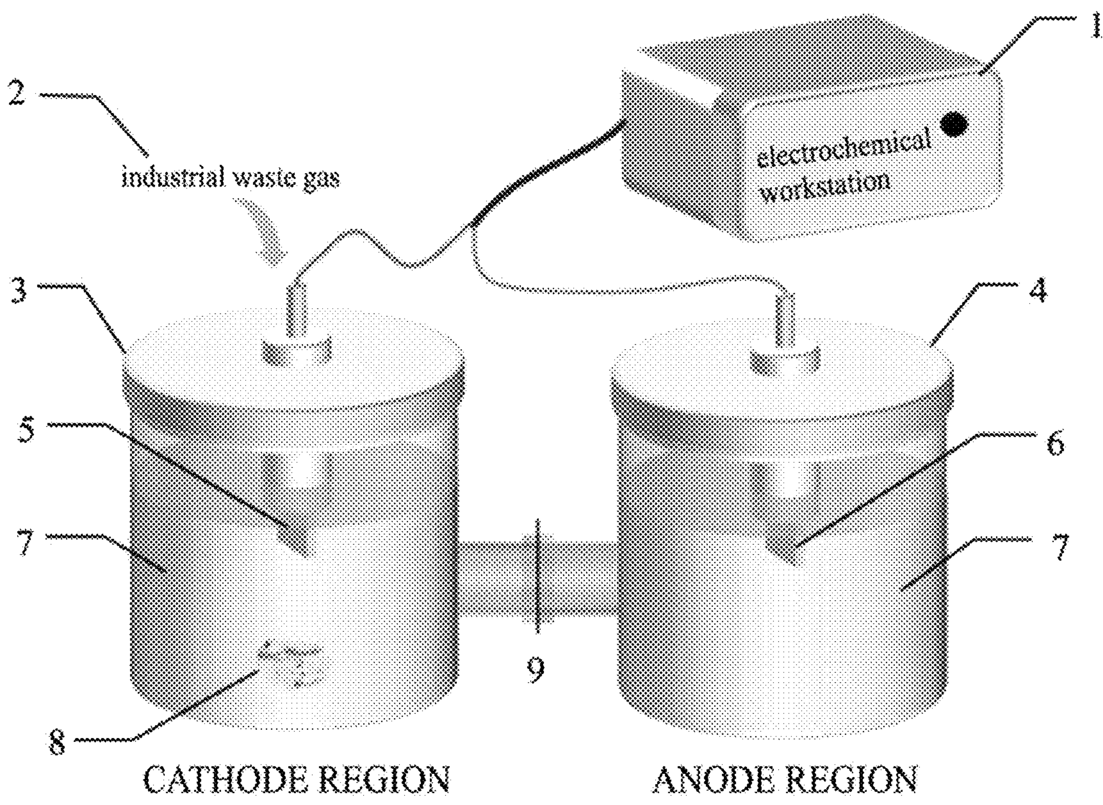
FIG. 2 is a diagram of an electrocatalytic reduction device.

Simple retrofitting is performed on a basis of the originally built H-type electrocatalytic oxidation electrolytic cell device. The prepared Fe-loaded $In(OH)_3$ nanomaterial is used to replace the $RuO_2$, $IrO_2$, and $Ti_4O_7$ electrode to become a new cathode, specifically, the chamber is transformed from the original anode region into a cathode region; and the graphite plate serves as a new anode, specifically, the chamber is transformed from the original cathode region into an anode region. By exchanging positions of positive and negative voltages, the retrofitting of the device can be completed (FIG. 2). Industrial waste gas (mainly containing $CO_2$ gas) is introduced into the cathode region, and a direct current power source is connected to provide an ultra-low voltage (−0.6 V vs. RHE). Under an action of current, nitrate, nitrite, and carbon dioxide gas in the sewage after oxidation in the second step are coupled as raw materials into urea; and a pH of a solution in the anode region is adjusted to about 9 through a pulse potential, promoting magnesium ion precipitated out from the magnesite to generate struvite precipitation with ammonia nitrogen and phosphate radical.

During a process of electrooxidation, the anode produces an acidic environment to promote the magnesite to continuously precipitate out magnesium ion; and in electroreduction, a pH of a solution in the cathode region is adjusted to about 9 through a pulse voltage, namely a manner of positive and negative voltage circulation, promoting magnesium ion, ammonia nitrogen, and phosphate radical to produce struvite precipitation.

Figure 3:
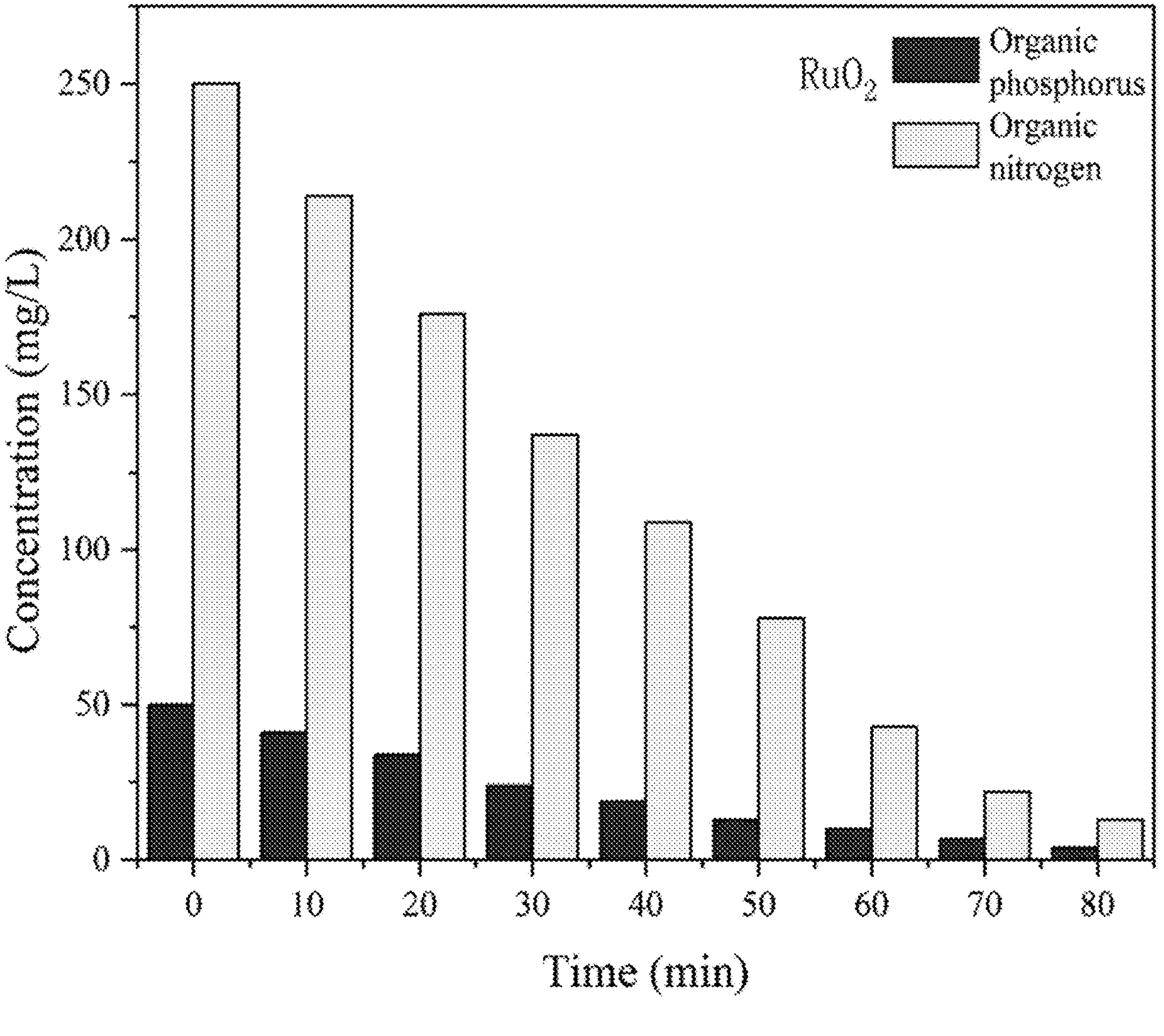
FIG. 3 is an effect diagram of a $RuO_2$ titanium-based electrode oxidizing organic nitrogen and phosphorus in a process of electrooxidation.
Figure 4:
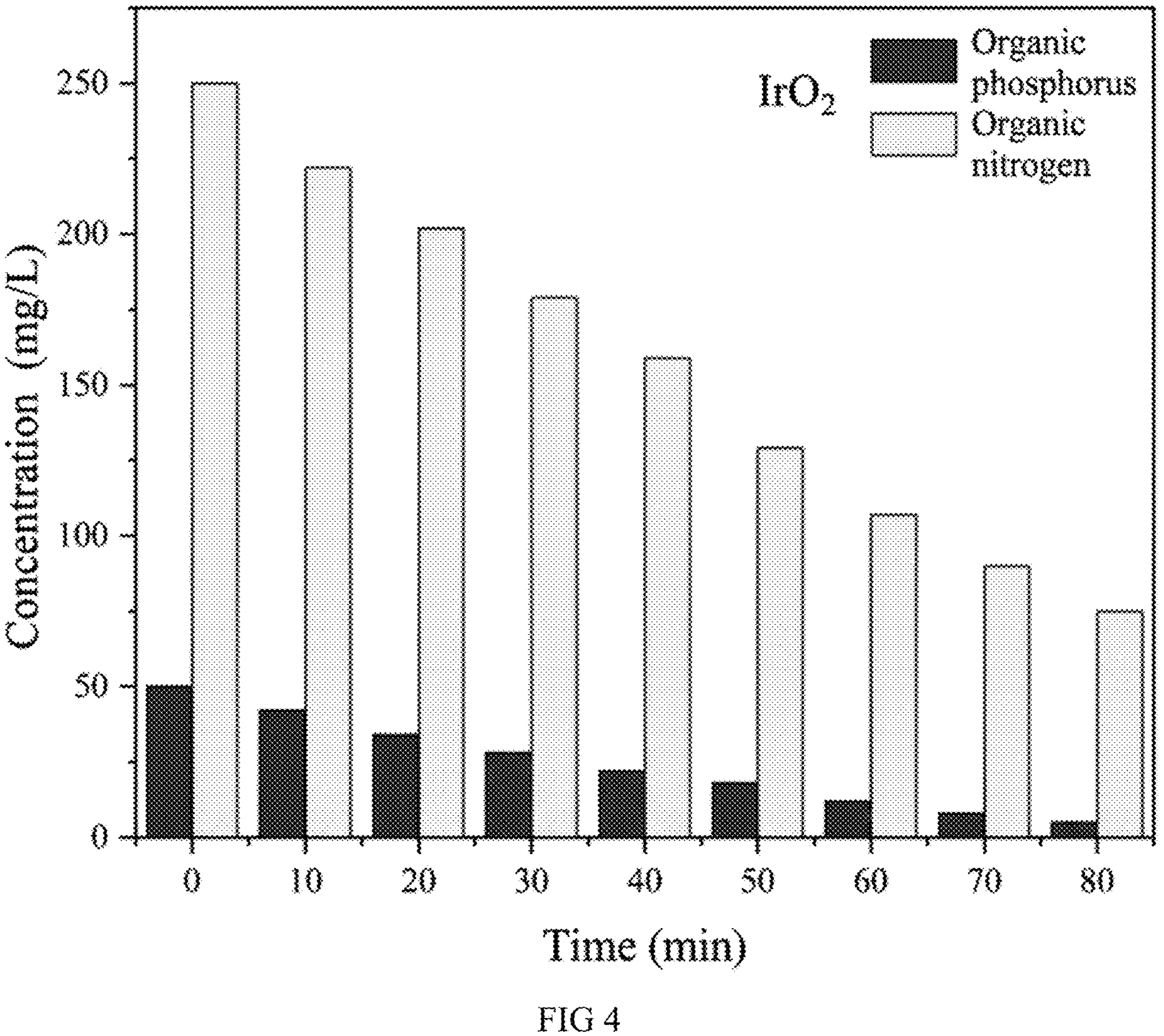
FIG. 4 is an effect diagram of an $IrO_2$ titanium-based electrode oxidizing organic nitrogen and phosphorus in a process of electrooxidation.
Figure 5:
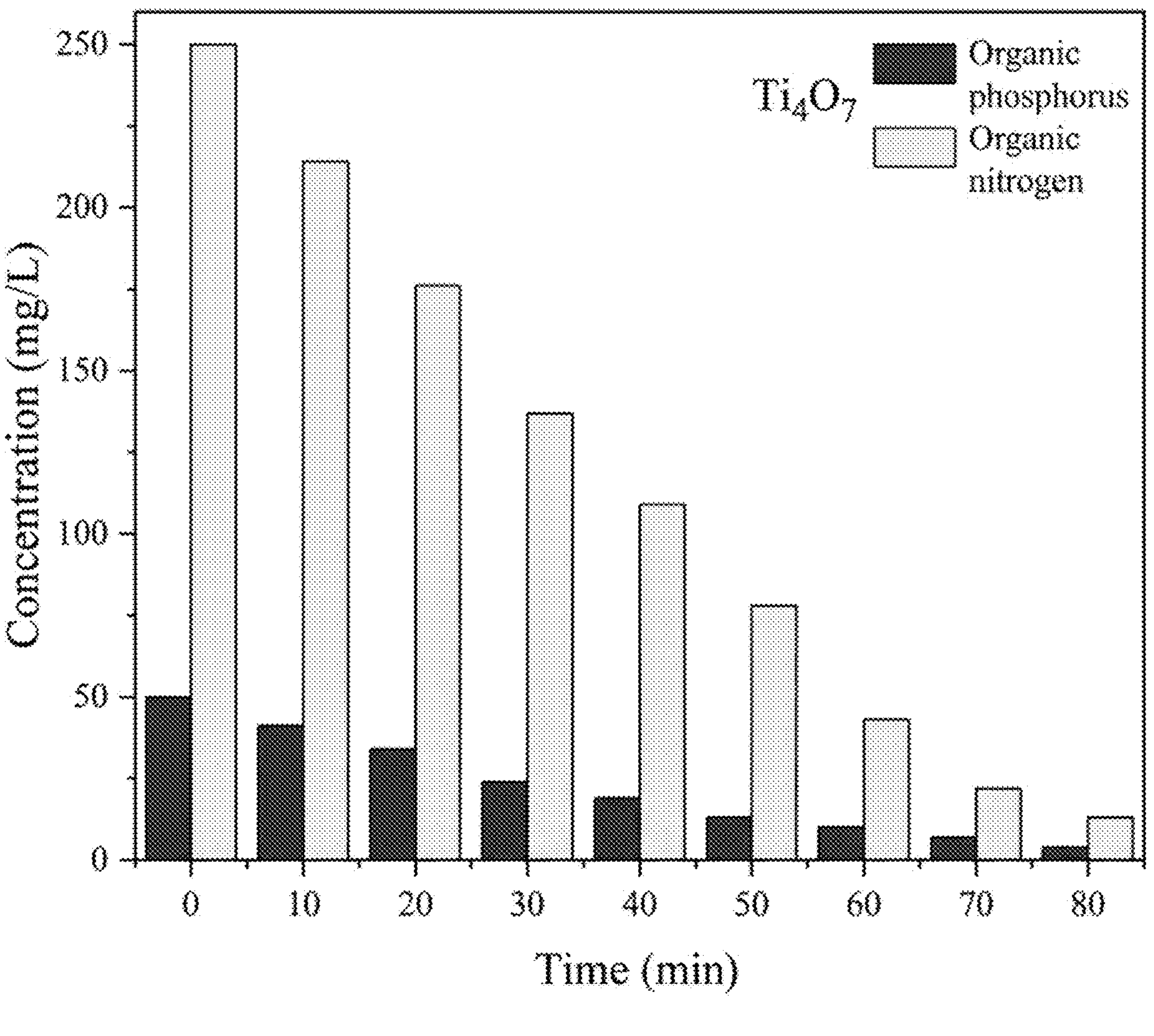
FIG. 5 is an effect diagram of a $Ti_4O_7$ titanium-based electrode oxidizing organic nitrogen and phosphorus in a process of electrooxidation.
Figure 6:
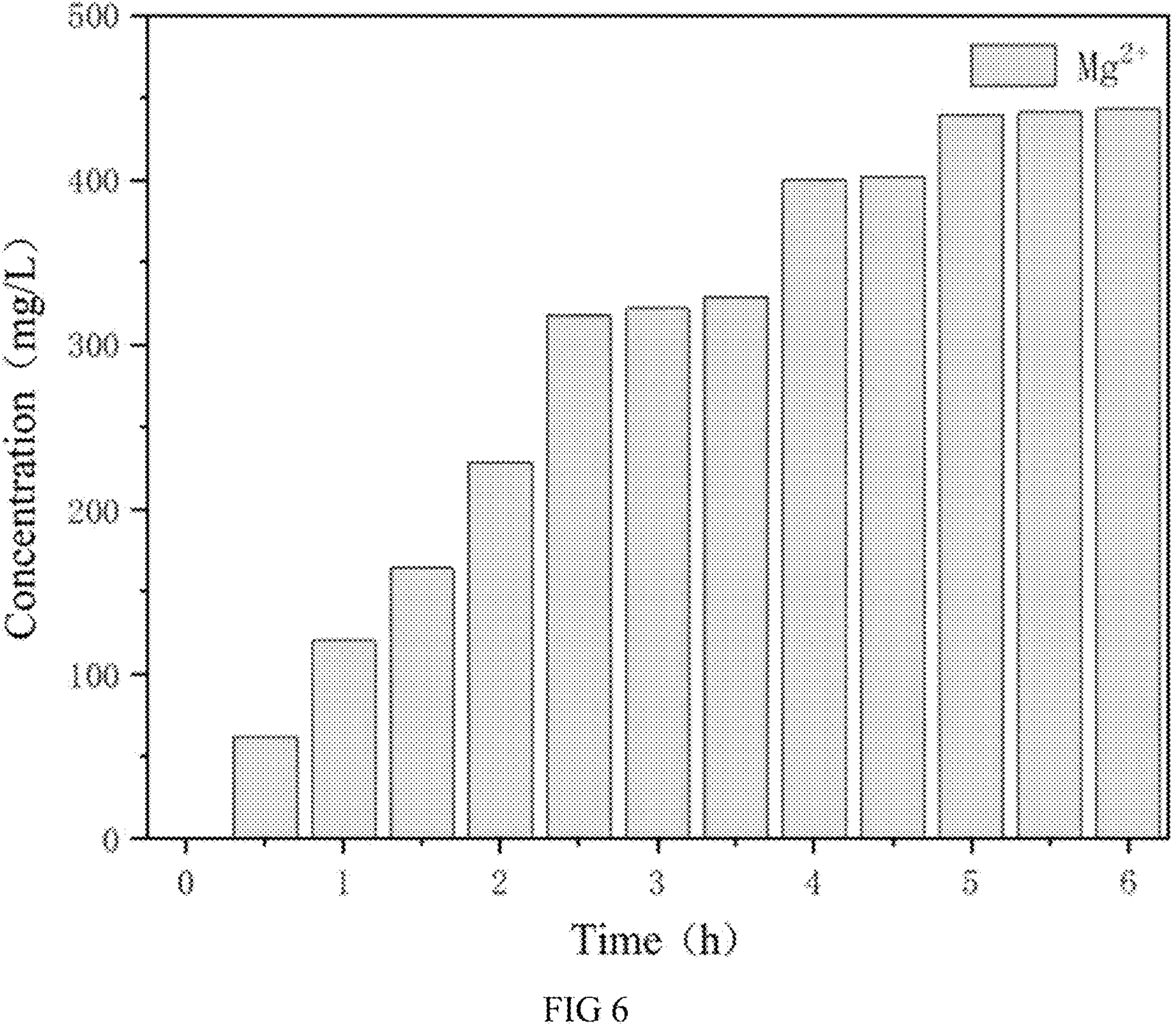
FIG. 6 is a concentration diagram of magnesium ion precipitating out from an anode.
Figure 7:
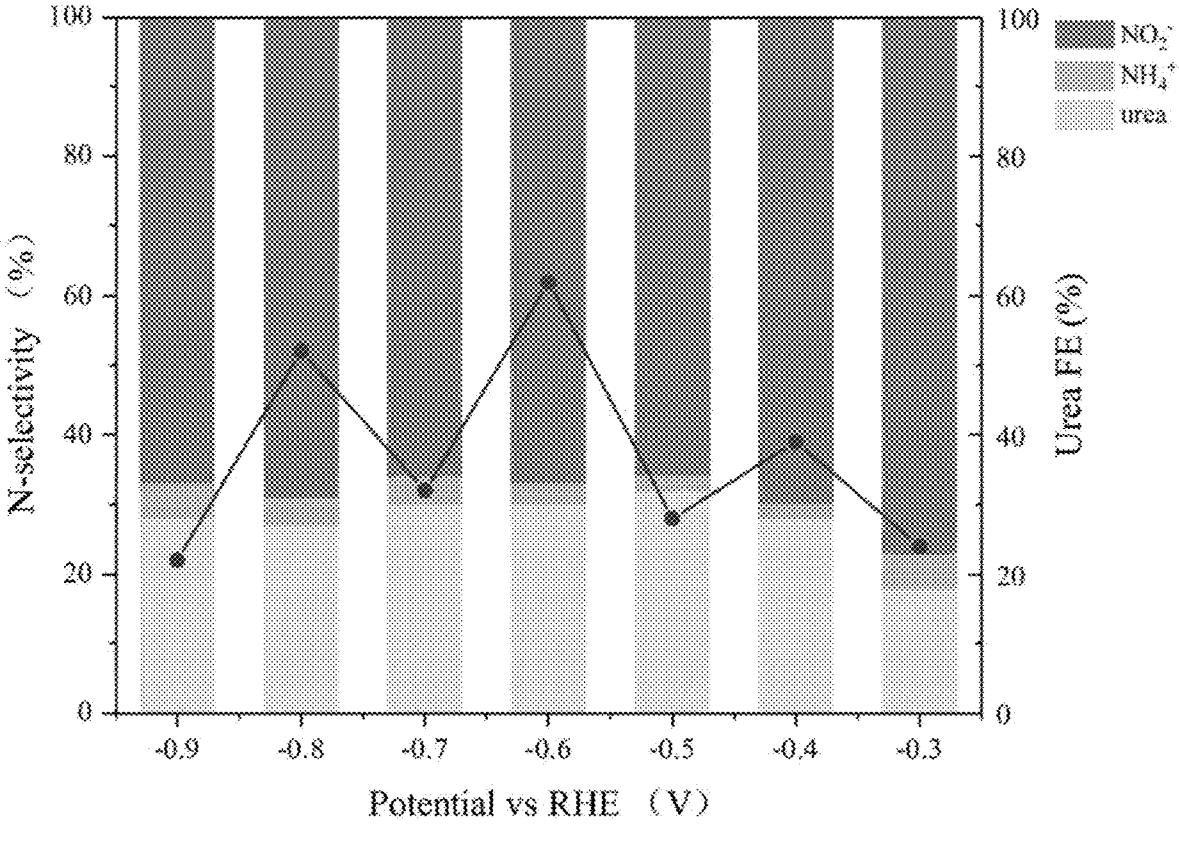
FIG. 7 is a performance diagram of electrochemical synthesis of urea.

FIG. 3, FIG. 4, and FIG. 5 are respectively effect diagrams of three kinds of different anodes of $RuO_2$, $IrO_2$, and $Ti_4O_7$ electrocatalytically oxidizing organic phosphorus and organic nitrogen. From this, it can be seen that oxidation efficiency of $RuO_2$ and $Ti_4O_7$ on organic nitrogen and organic phosphorus is significant. After 80 min of electrocatalytic oxidation, oxidation rates all reached about 90%. Oxidation efficiency of $IrO_2$ is slightly lower, but still remains above 70%, indicating that the three kinds of anodes of $RuO_2$, $IrO_2$, and $Ti_4O_7$ possess certain considerable oxidation performance during electrocatalyzing organic nitrogen and organic phosphorus. FIG. 7 is a change diagram of selectivity of nitrogen and Faraday efficiency of urea with voltage in electrochemical synthesis of urea. The selectivity of nitrogen does not change significantly with voltage. The Faraday efficiency of urea presents a "sawtooth-like" change trend with rising of the voltage, and reached a peak value of 62% at an optimal potential of −0.6 V vs. RHE, showing that the metal Fe-loaded $In(OH)_3$ nanomaterial possesses excellent reducing performance.

The examples described above only express several examples of the present disclosure, and descriptions thereof are relatively specific and detailed, but are not used to limit the present disclosure. It should be pointed out that for those skilled in the art, the present disclosure can further have various changes and modifications. Any modification, equivalent replacement, improvement, etc. made within the concept and principle of the present disclosure shall all be included within the protection scope of the present disclosure.

What is claimed is:

1. A method for electrochemical synchronous synthesis of urea and struvite using nitrogen and phosphorus pollutants and waste gas, comprising the following steps:

Step 1: preparing an anode material using $RuO_2$, $IrO_2$, and $Ti_4O_7$, and using graphite as a cathode to construct a dual-chamber type H-type electrolytic cell; introducing sewage containing nitrogen and phosphorus and magnesite into an anode region, and connecting a power source to perform an electrocatalytic oxidation reaction;

wherein a specific method for preparing the anode material using $RuO_2$, $IrO_2$, and $Ti_4O_7$ in Step 1 is: using nickel foam as a substrate material of an electrode; taking equal mass of $RuO_2$, $IrO_2$, and $Ti_4O_7$ to be added into a distilled water/ethanol dispersant; performing ultrasonic dispersion to a uniform ink-like state; and adding conductive adhesive for coating onto a treated titanium plate to obtain a $RuO_2$, $IrO_2$, and $Ti_4O_7$ nickel foam anode material;

wherein a main reaction formula in Step 1 is:

$$\text{organic nitrogen} \rightarrow NO_3^- + NO_2^-$$

$$\text{organic phosphorus} \rightarrow PO_4^{3-}$$

$$\text{magnesite} \rightarrow Mg^{2+};$$

Step 2: preparing a metal-loaded $In(OH)_3$ nanomaterial; on a basis of the electrolytic cell in Step 1, using the $In(OH)_3$ nanomaterial to replace the anode prepared by $RuO_2$, $IrO_2$, and $Ti_4O_7$ to become a new cathode, and using graphite as a new anode; introducing waste gas containing carbon dioxide into a cathode region; and exchanging positive and negative electrodes and connecting a power source to perform an electrocatalytic reduction reaction to obtain urea and struvite;

wherein a preparation method of the metal-loaded $In(OH)_3$ nanomaterial in Step 2 is: ultrasonically dispersing $In(OH)_3$ powder in deionized water; adding a compound of metal M for stirring; and adding a sodium carbonate solution to obtain a suspension; and after filtering, washing, and drying, calcining to obtain a metal M-loaded $In(OH)_3$ nanomaterial; wherein the metal M is Fe, Mn, or Co;

wherein a main reaction formula in Step 2 is:

$$2NO_3^- + CO_2 + 18H^+ + 16e^- \rightarrow NH_2CONH_2 + 7H_2O$$

$$CO_2 + 2NO_2^- + 14H^+ + 12e^- \rightarrow NH_2CONH_2 + 5H_2O$$

$$NH_4^+ + Mg^{2+} + PO_4^{3-} + 6H_2O \rightarrow Mg(NH_4)PO_4 \cdot 6H_2O.$$

2. The method for electrochemical synchronous synthesis of urea and struvite using nitrogen and phosphorus pollutants and waste gas according to claim 1, wherein the dual-chamber type H-type electrolytic cell in Step 1 uses 0.1 mmol/L $Na_2SO_4$ as an electrolyte, and the cathode region and the anode region are separated by a proton exchange membrane; and a proportion of organic nitrogen and phosphorus in the sewage containing nitrogen and phosphorus is 5:1.

3. The method for electrochemical synchronous synthesis of urea and struvite using nitrogen and phosphorus pollutants and waste gas according to claim 1, wherein the calcining is performed in an $H_2$/Ar mixture, and a calcining temperature is 250° C.

4. The method for electrochemical synchronous synthesis of urea and struvite using nitrogen and phosphorus pollutants and waste gas according to claim 1, wherein the electrocatalytic reduction reaction in Step 2 uses a pulse potential and a constant potential to inhibit a side reaction to increase a yield of urea, a multi-stage potential is −0.3 to −0.9 V vs. RHE, and a pH of a solution in the anode region is adjusted to 9 through the pulse potential.

* * * * *